(12) United States Patent
Alberkrack et al.

(10) Patent No.: US 7,710,054 B2
(45) Date of Patent: May 4, 2010

(54) FAN CONTROLLER WITH DUTY CYCLE COMPARATOR

(75) Inventors: Jade H. Alberkrack, Tempe, AZ (US); Robert Alan Brannen, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 449 days.

(21) Appl. No.: 11/729,999

(22) Filed: Mar. 29, 2007

(65) Prior Publication Data

US 2008/0240688 A1    Oct. 2, 2008

(51) Int. Cl.
*H02P 6/06* (2006.01)
(52) U.S. Cl. .................. 318/400.06; 318/599; 388/811
(58) Field of Classification Search ........... 318/461, 318/400.06, 599; 388/800, 806, 811, 821, 388/907.5, 910
See application file for complete search history.

(56) References Cited

U.S. PATENT DOCUMENTS

| | | | | |
|---|---|---|---|---|
| 4,839,754 A | * | 6/1989 | Gami et al. .............. 360/73.01 |
| 4,893,067 A | * | 1/1990 | Bhagwat et al. ............. 388/823 |
| 4,943,760 A | * | 7/1990 | Byrne et al. ................ 318/701 |
| 5,019,757 A | * | 5/1991 | Beifus ................... 318/400.07 |
| 5,159,218 A | * | 10/1992 | Murry et al. .............. 310/68 B |
| 5,410,229 A | * | 4/1995 | Sebastian et al. ............ 318/434 |
| 5,736,823 A | * | 4/1998 | Nordby et al. .............. 318/432 |
| 5,990,753 A | * | 11/1999 | Danstrom et al. ........... 331/143 |
| 6,943,604 B2 | * | 9/2005 | Minzoni ..................... 327/175 |

* cited by examiner

*Primary Examiner*—Rina I Duda
(74) *Attorney, Agent, or Firm*—Donald J. Lenkszus

(57) ABSTRACT

A motor controller for a direct current motor includes a first node receiving first PWM signals having a duty cycle indicative of a desired rotational speed of said motor and an input node receiving second digital signals, the frequency of said second signals indicative of the rotational speed of said motor. A frequency-to-PWM circuit is coupled to the input node to provide second PWM signals having a duty cycle corresponding to the rotational speed of the motor. A duty cycle comparator has a first input coupled to the first node and a second input coupled to the second node to generate a control signal for controlling the rotational speed of the motor.

29 Claims, 5 Drawing Sheets 901 receiving first digital signals having a first duty cycle;

903 receiving second digital signals having a second duty cycle;

905 providing a charge accumulation device;

907 controlling a first controlled current source with the first digital signals to charge the charge accumulation device;

909 controlling a second controlled current source with the second digital signals to discharge the charge accumulation device;

911 using the charge on the charge accumulation device to produce an output signal representative of the difference in duty cycles of the first digital signals and the second digital signals.

FIG. 9 ured to drive DC motor 101.

FAN CONTROLLER WITH DUTY CYCLE COMPARATOR

FIELD OF THE INVENTION

The invention pertains to a fan controller, in general, and to a fan controller arrangement that utilizes a duty cycle comparator to generate a signal to control a direct current motor, in particular.

SUMMARY OF THE INVENTION

A motor controller for a direct current motor, in accordance with the principles of the invention includes a first node receiving first PWM signals having a duty cycle indicative of a desired rotational speed of said motor and an input node receiving second digital signals, the frequency of said second signals indicative of the rotational speed of said motor. A frequency-to-PWM circuit is coupled to the input node to provide second PWM signals having a duty cycle corresponding to the rotational speed of the motor. A duty cycle comparator has a first input coupled to the first node and a second input coupled to the second node to generate a control signal for controlling the rotational speed of the motor.

Further in accordance with the principles of the invention a motor drive circuit is controlled by the control signal and is coupleable to a direct current motor to selectively energize the motor.

Yet further in accordance with the principles of the invention the motor controller is formed on a single integrated circuit comprising the frequency-to-PWM circuit, the duty cycle comparator, and the motor drive circuit.

Still further in accordance with the principles of the invention the motor controller is formed on a single substrate having the frequency-to-PWM circuit, the duty cycle comparator, and the motor drive circuit formed thereon.

Yet further in accordance with the principles of the invention, the first PWM signals may be at a first frequency and the second PWM signals may be at the same frequency or at a second frequency different from said first frequency. In the illustrative embodiment of the invention the first frequency is higher than the second frequency.

Further in accordance with the principles of the invention, the duty cycle comparator comprises a first controlled current source having a control input coupled to the first node, a second controlled current source having a control input coupled the second node, and a charge accumulation device coupled to the first and second controlled current sources and to the first output node to generate the control signal. In the illustrative embodiment of the invention, the charge accumulation device is a capacitor.

BRIEF DESCRIPTION OF THE DRAWING

The invention will be better understood from a reading of the following detailed description of the drawing in which like reference designators are used to identify like elements in the various drawing figures, and in which:

FIG. 9 illustrates the steps in comparing duty cycles in accordance with the invention.

DETAILED DESCRIPTION

Figure 1:
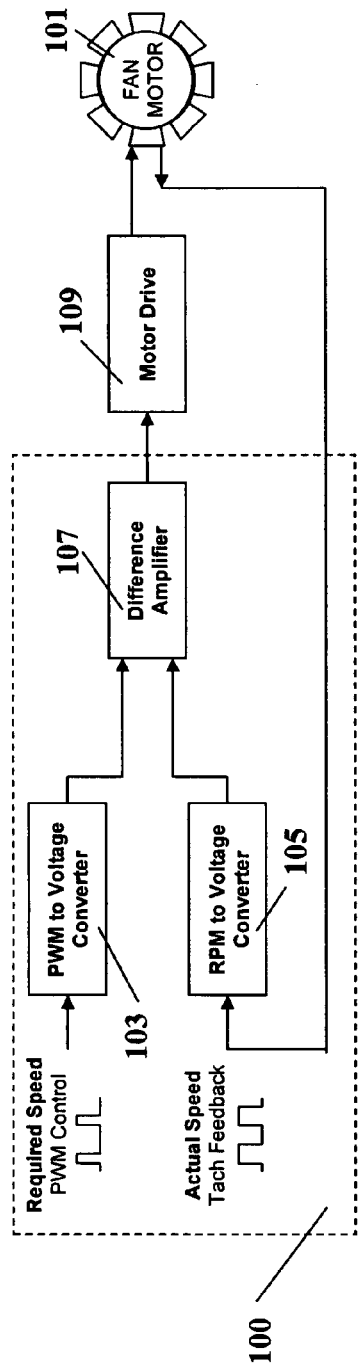
FIG. 1 is block diagram of a prior art motor controller and fan.

FIG. 1 illustrates a prior art closed loop voltage comparison type controller 100 and drive arrangement 109 for controlling the speed of a DC motor 101 that is utilized as part of a cooling fan assembly of a computer which is not shown. An input PWM (Pulse Width Modulated) signal that indicates the desired fan or motor speed is provided to a PWM-to-voltage converter 103. Converter 103 generates an output voltage that is representative of the desired fan speed.

DC motor 101 provides an output signal TACH that is indicative of the actual rotational speed of DC motor 101. This actual speed signal TACH is converted to a voltage representative of the actual motor speed by an RPM-to-voltage converter circuit 105.

PWM-to-voltage converter 103 provides an analog voltage that is proportional to the desired or required speed of motor 101. RPM-to-voltage converter 105 provides an analog voltage that is proportional to the actual speed of motor 101.

The voltage outputs of voltage converter 103 and voltage converter 105 are both applied to the inputs of a difference amplifier 107 which in turn generates a control loop error voltage that is used to control a motor drive circuit 109 utilized to drive DC motor 101.

Figure 2:
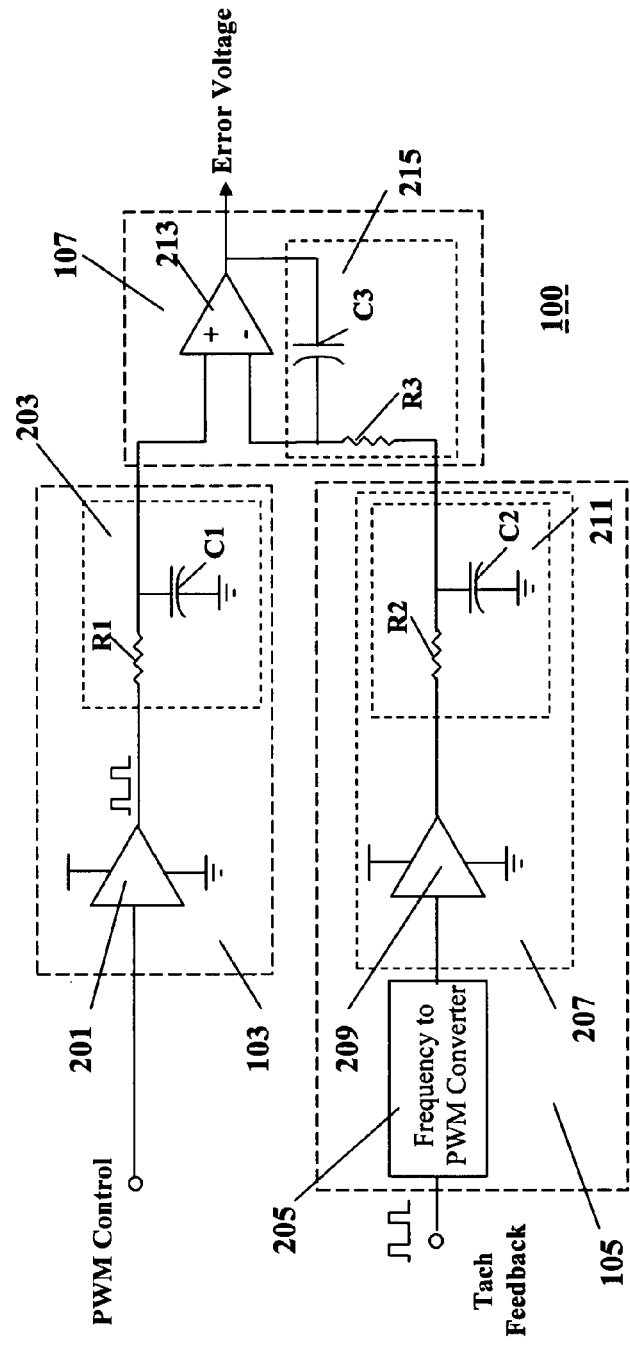
FIG. 2 illustrates a portion of the prior art motor controller of FIG. 1 in greater detail.

FIG. 2 illustrates controller 100 in greater detail. Converter 103 includes a buffer 201 and low pass filter 203 comprising resistor R1 and capacitor C1. Converter 105 includes frequency-to-PWM converter circuit 205 and PWM-to-voltage converter 207. Converter 205 receives the speed signal from fan motor 101 and generates a PWM signal in dependence on the frequency of the motor speed signal. The PWM output of converter 205 is applied to a second PWM-to-voltage converter 207. Converter 207 includes a buffer amplifier 209 and a low pass filter 211 comprising resistor R2 and capacitor C2. Difference amplifier 107 includes a difference amplifier circuit 213 and a low pass filter 215 comprising resistor R3 and capacitor C3.

The prior art closed loop voltage comparison type controller 100 is an analog closed loop arrangement. There are several problems with this type of arrangement that are of particular concern in providing an integrated controller. More specifically, the closed loop voltage comparison type controller 100 requires that the Vdd supply voltage level to PWM-to-voltage converter 103 and PWM-to-voltage converter 207 be regulated; the use of three capacitors C1, C2, C3 that add cost; and the use of a difference amplifier 213 to produce a speed error or correction signal.

Figure 3:
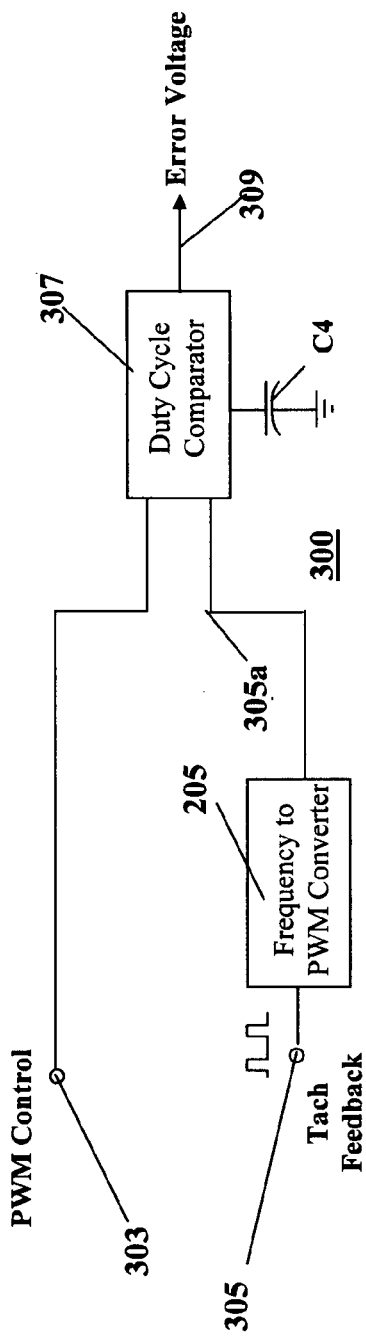
FIG. 3 is a diagram of a portion of a motor controller in accordance with the principles of the invention.

Turning now to FIG. 3, an improved closed loop motor controller 300 is shown in block diagram form. Controller 300 receives a PWM control signal corresponding to a desired motor speed at a first input 303. The duty cycle of the PWM control signal at first input 303 is proportional to the desired or required speed of the motor.

A tachometer feedback signal from the motor is received at terminal 305. This signal varies in frequency in proportion to the speed of the motor. The tachometer feedback signals are coupled to the input of a frequency-to-PWM converter circuit 205. Frequency-to-PWM converter circuit 205 provides an output pulse train that has a duty cycle proportional to the actual speed of the motor. A duty cycle comparator circuit 307 has a first input coupled to the PWM control input terminal 303 and a second input coupled to the output of the frequency-to PWM converter circuit 205. Duty cycle comparator 307 compares the duty cycles of the signals at its two inputs and generates a control loop error voltage signal at its output 309 to the motor drive circuit.

Figure 4:
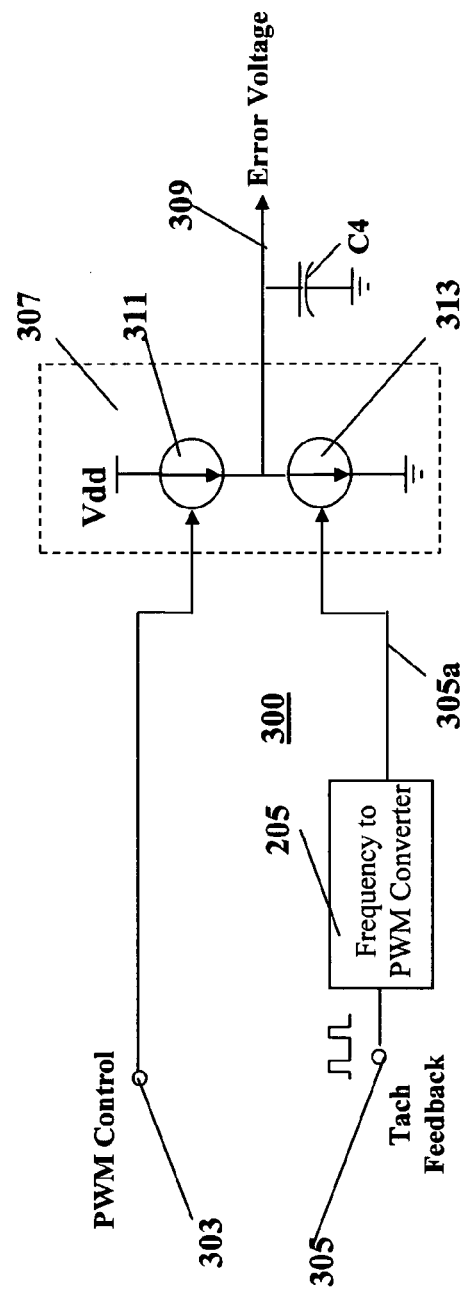
FIG. 4 illustrates the duty cycle comparator of the controller of FIG. 3 in greater detail.

Turning now to FIG. 4, details of duty cycle comparator 307 are shown. Duty cycle comparator 307 includes a first controllable current source 311 and a second controllable current source 313 both of which are coupled to capacitor C4. Capacitor C4 is a low pass filter that provides charge accumulation/error integration. Current source 311 is controlled by a PWM control signal and charges capacitor C4 when the PWM control signal is in a high state. Current source 313 is controlled by the output signal of the frequency-to-PWM converter 205 and discharges capacitor C4 in proportion to the actual motor speed. Capacitor C4 acts as a charge accumulator.

Figure 5:
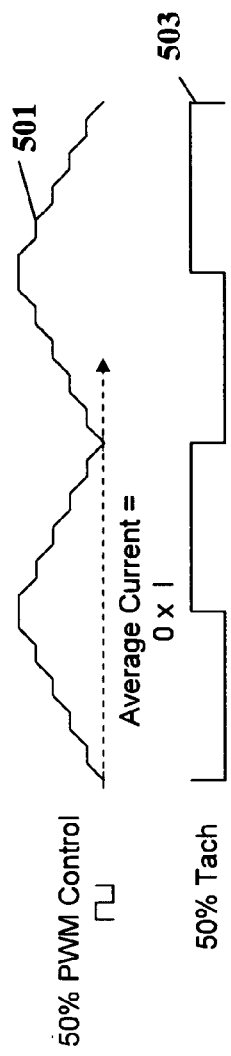
FIGS. 5, 6, and 7 are waveforms showing the operation of the duty cycle comparator of FIG. 4.
Figure 6:
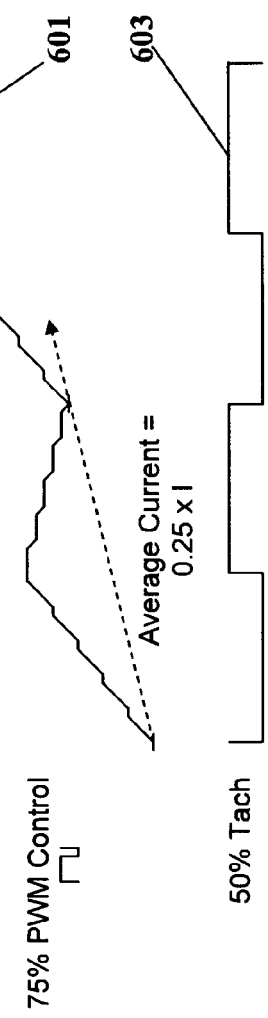
Figure 7:
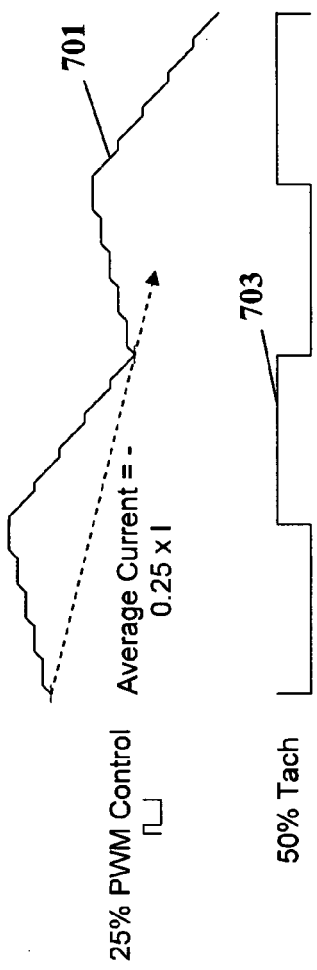

FIGS. 5, 6, and 7 illustrate operation of the duty cycle comparator 307. In each of the FIGS. 5, 6, and 7, it is assumed that current sources 311, 313 both supply identical current levels, 1, such that current source 311 charges capacitor C4 with a current I and current source 313 discharges capacitor C4 with current I. It is also assumed that the PWM control signal is at a higher frequency than the tachometer feedback signal. The tachometer feedback signal is adjusted such that the duty cycle of the tachometer feedback signal, 305a is 50% when the motor is running at 50% of its maximum speed.

Turning to FIG. 5, waveform 501 represents the voltage across capacitor C4, under the conditions that the desired motor speed is at 50% of maximum speed and the motor is operating at 50% of its maximum speed. The tachometer feedback signal is at a 50% duty cycle corresponding to half speed as shown by waveform 503. Under these conditions, the average charge and discharge current flows to capacitor C4 are equal and the voltage across capacitor C4 is at equilibrium.

Turning to FIG. 6, waveform 601 represents the voltage across capacitor C4, under the conditions that the desired motor speed is at 75% of maximum speed and the motor is operating at 50% of its maximum speed. The tachometer feedback signal is at a 50% duty cycle corresponding to half speed as shown by waveform 603. Under these conditions, the average current flow to capacitor C4 is 0.25×I, and the voltage across capacitor C4 rises until the motor speeds up to the desired speed.

Turning to FIG. 7, waveform 701 represents the voltage across capacitor C4, under the conditions that the desired motor speed is at 25% of maximum speed and the motor is operating at 50% of its maximum speed. The tachometer feedback signal is at a 50% duty cycle corresponding to half speed as shown by waveform 703. Under these conditions, the average current from capacitor C4 is 0.25×I, and the voltage across capacitor C4 falls until the motor slows to the desired speed.

There are significant advantages to utilizing duty cycle comparator 307. One such advantage is that the supply voltage Vdd does not need to be regulated because current sources are utilized. In addition, only one filter capacitor C4 is utilized thereby saving component cost. A difference amplifier is also not required because filter capacitor C4 automatically provides the error voltage. Still further, the charge and discharge currents do not need to be exact, but only ratio metric.

Figure 8:
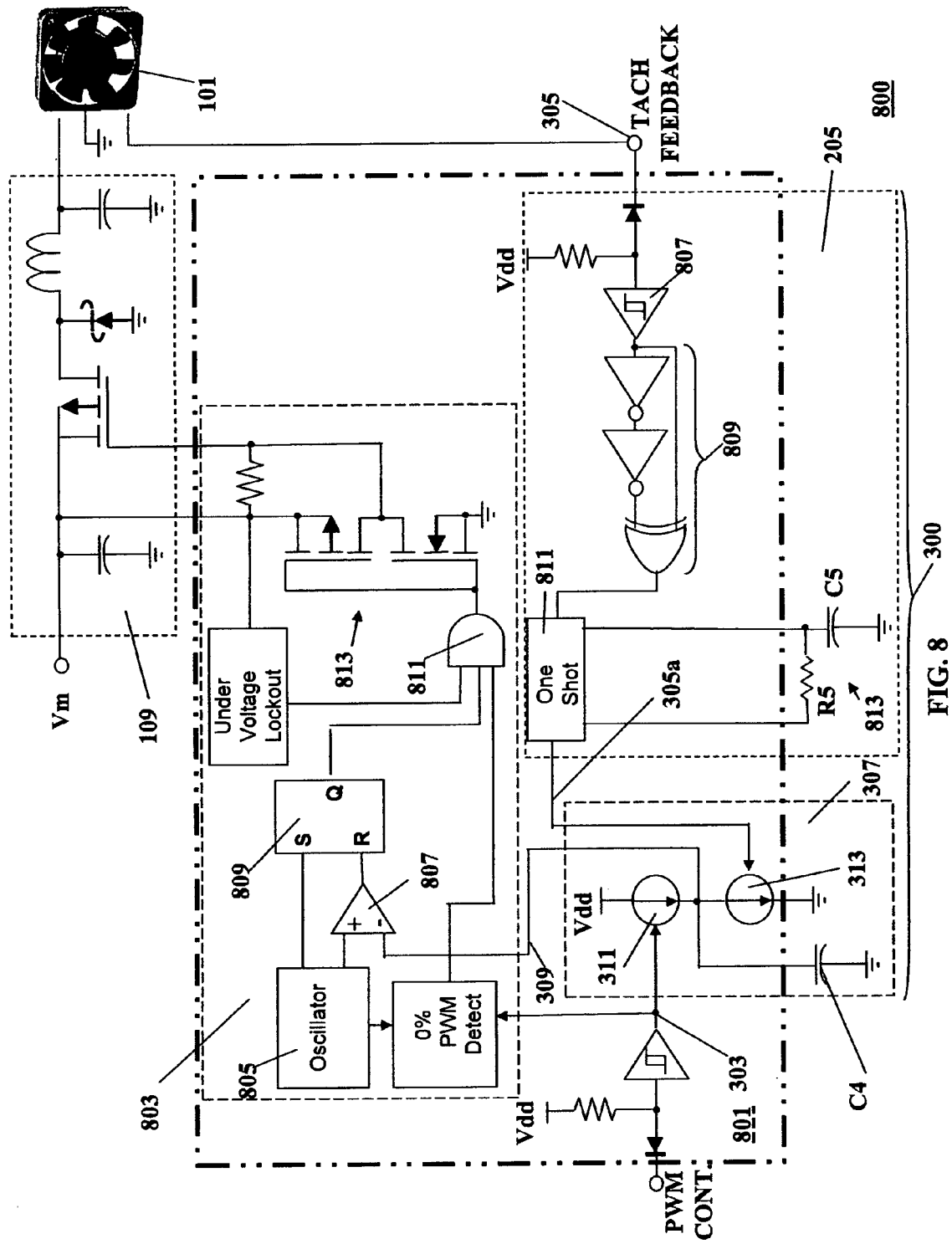
FIG. 8 is a more detailed diagram of a motor controller in accordance with the principles of the invention.

A controller 800, integrated on a single chip 801 contains all required functions for implementing fan speed control. As shown in FIG. 8, the motor controller of the invention comprising a frequency-to-PWM converter circuit 205 coupled to the tachometer feedback signal and to a duty cycle comparator 307 integrated onto a substrate 801. Frequency to PWM converter circuit 205 includes a buffer circuit 807 coupled to the tachometer feedback terminal and edge detector 809. Edge detector 809 drives one shot circuit 811. A timing circuit 813, coupled to one shot circuit 811, comprises resistor R5 and capacitor C5. The values of resistor R5 and capacitor C5 are selected for the maximum motor speed at 100% PWM signals.

Controller 800 also includes a pulse width modulator 803 integrated on substrate 801. Pulse width modulator 803 comprises a fixed frequency oscillator 805 that provides a pulse output and a saw tooth output, comparator 807, and a latch 809 along with associated gates 811 for motor speed control of motor 101. Controller 800 also includes driver circuit 813 integrated onto substrate 801 for driving an external switch transistor.

In other embodiments of the invention, controller 300 may be integrated onto the same silicon substrate or chip as the device being cooled by fan 101, such as onto a microprocessor substrate.

Duty cycle comparator 307 comprises a first input 303 to receive a first digital signal having a first duty cycle and a second input 305a to receive a second digital signal having a second duty cycle. A first controlled current source 311 has a control input coupled to the first input 303. A second controlled current source 313 has a control input coupled the second input 305a. A charge accumulation device or capacitor C4 is coupled to the first and second controlled current sources 311, 313. The first controlled current source 311 increases the charge accumulated by charge accumulation device or capacitor C4 in response to the first digital signal. The second controlled current source 313 decreases the charge accumulated by the charge accumulation device or capacitor C4 in response to the second digital signal. Charge accumulation device produces an output signal voltage at output 309 that is representative of the difference in duty cycles of the first digital signal and the second digital signal.

In the embodiment of the invention, the first digital signal is at a first frequency and the second digital signal is at a second frequency different from the first frequency. More specifically, the first frequency is higher than the said frequency. However, in other embodiments, the first and second frequencies may be equal or the first frequency may be lower than the second frequency.

The output signal produced by the charge accumulation device or capacitor C4 is an analog voltage signal.

In accordance with an aspect of the invention, the embodiment provides a method of comparing duty cycles of two digital signals as shown in FIG. 9. The method comprises the steps of:

receiving a first digital signal having a first duty cycle, 901;

receiving a second digital signal having a second duty cycle, 903;

providing a charge accumulation device, 905;

controlling a first controlled current source with the first digital signal to charge the charge accumulation device, 907;

controlling a second controlled current source with the second digital signal to discharge the charge accumulation device, 909; and using the charge on the charge accumulation device to produce an output signal representative of the difference in duty cycles of the first digital signal and the second digital signal, 911.

It will be understood by those skilled in the art that the term "current source" as utilized herein includes current sources and current sinks. It will also be understood by those skilled in the art that many different implementations for current sources exist and that the invention is not dependent upon any specific implementation of a current source. It will also be understood by those skilled in the art that signal inputs 303 and 305a can be interchanged so that a decrease in the output voltage increases the motor speed.

The invention has been described in conjunction with a specific illustrative embodiment. It will be understood by those skilled in the art that various changes, substitutions and modifications may be made without departing from the spirit or scope of the invention. It is intended that all such changes, substitutions and modifications be included in the scope of the invention. It is not intended that the invention be limited to the illustrative embodiment shown and described herein. It is intended that the invention be limited only by the claims appended hereto, giving the claims the broadest possible scope and coverage permitted under the law.

What is claimed is:

1. A motor controller for a direct current motor, comprising:
   a first node receiving a first PWM signal, said first PWM signal having a duty cycle indicative of a desired rotational speed of said motor;
   an input node receiving a second signal, the frequency of said second signal indicative of the rotational speed of said motor;
   a frequency to PWM circuit coupled to said input node to provide, at a second node, a second PWM signal having a duty cycle corresponding to said rotational speed of said motor; and
   a duty cycle comparator having a first input coupled to said first node to receive said first PWM signal and a second input coupled to said second node to receive said second PWM signal to generate a control signal at an output node directly from said first PWM signal and said second PWM signal for controlling the rotational speed of said motor.

2. A motor controller in accordance with claim 1, comprising:
   a motor drive circuit controlled by said control signal and coupleable to a direct current motor to selectively energize said motor.

3. A motor controller in accordance with claim 2, comprising:
   a single integrated circuit comprising said frequency to PWM circuit, said duty cycle comparator, and said motor drive circuit formed thereon.

4. A motor controller in accordance with claim 2, comprising:
   a single substrate having said frequency to PWM circuit, said duty cycle comparator, and said motor drive circuit formed thereon.

5. A motor controller in accordance with claim 1, wherein:
   said first PWM signals are at a first frequency and said second PWM signals are at a second frequency different from said first frequency.

6. A motor controller in accordance with claim 1, wherein:
   said duty cycle comparator produces said output signal representative of the difference in duty cycles of said first PWM signal and said second PWM signal, independent of the frequencies of said first PWM signal and said second PWM signal.

7. A motor controller in accordance with claim 1, wherein:
   said duty cycle comparator comprises: a first controlled current source having a control input coupled to said first node to receive said first PWM signal, a second controlled current source having a control input coupled said second node to receive said second PWM signal, and a charge accumulation device coupled to said first and second controlled current sources and to said output node to generate said control signal at said output node.

8. A motor controller in accordance with claim 7, wherein:
   said charge accumulation device is a capacitor.

9. A motor controller in accordance with claim 8, comprising:
   a single integrated circuit comprising said frequency to PWM circuit and said duty cycle comparator formed thereon.

10. A motor controller in accordance with claim 8, comprising:
    a single substrate having said frequency to PWM circuit and said duty cycle comparator formed thereon.

11. A motor controller in accordance with claim 7, wherein:
    said first PWM signal is at a first frequency and said second PWM signal is at a second frequency different from said first frequency.

12. A motor controller in accordance with claim 11, wherein:
    said duty cycle comparator produces said output signal representative of the difference in duty cycles of said first PWM signal and said second PWM signal, independent of the frequencies of said first PWM signal and said second PWM signal.

13. A motor controller in accordance with claim 7, comprising:
    a motor drive circuit coupled to said output node and controlled by said control signal and coupleable to a direct current motor to selectively energize said motor.

14. A motor controller in accordance with claim 13, comprising:
    a single integrated circuit comprising said frequency to PWM circuit, said duty cycle comparator, and said motor drive circuit formed thereon.

15. A motor controller in accordance with claim 13, comprising:
    a single substrate having said frequency to PWM circuit, said duty cycle comparator, and said motor drive circuit formed thereon.

16. A motor controller for a direct current motor, comprising:
    a first node receiving a first PWM signal, said first PWM signal having a duty cycle indicative of a desired rotational speed of said motor;
    an input node receiving a first digital signal, the frequency of said first digital signal indicative of the rotational speed of said motor;
    a frequency to PWM circuit coupled to said input node to provide, at a second node, second PWM signals having a duty cycle corresponding to said rotational speed of said motor; and
    a duty cycle comparator, comprising:
    a first switchable current source coupled to said first node and controlled by said first PWM signal;
    a second switchable current source coupled to said second node and controlled by said second PWM signal; and
    a charge accumulation device coupled to said first and said second switchable current sources to generate a motor speed control signal.

17. A motor controller in accordance with claim 16, comprising:
a motor drive circuit controlled by said control signal and coupleable to a direct current motor to selectively energize said motor.

18. A motor controller in accordance with claim 17, comprising:
a single integrated circuit comprising said frequency to PWM circuit, said duty cycle comparator, and said motor drive circuit formed thereon.

19. A motor controller in accordance with claim 17, comprising:
a single substrate having said frequency to PWM circuit, said duty cycle comparator, and said motor drive circuit formed thereon.

20. A motor controller in accordance with claim 16, wherein:
said first PWM signal is at a first frequency and said second PWM signal is at a second frequency different from said first frequency.

21. A motor controller for a direct current motor, comprising:
a first node receiving a first PWM signal, said first PWM signal having a duty cycle indicative of a desired rotational speed of said motor;
an input node receiving a second digital signal, the frequency of said second signals indicative of the rotational speed of said motor;
a frequency to PWM circuit coupled to said input node to provide, at a second node, a second PWM signal having a duty cycle corresponding to said rotational speed of said motor; and
a duty cycle comparator, comprising:
a first controlled current source having a control input coupled to said first node; a second controlled current source having a control input coupled said second node; and
a charge accumulation device coupled to said first and second controlled current sources, said first controlled current source changing in a first direction the charge accumulated by said charge accumulation device in response to said first PWM signal, said second controlled current source changing in a second direction opposite to said first direction the charge accumulated by said charge accumulation device in response to said second PWM signal, said charge accumulation device producing an output signal representative of the difference in duty cycles of said first PWM signal and said second PWM signal.

22. A motor controller in accordance with claim 21, wherein:
said charge accumulation device comprises a capacitor.

23. A motor controller in accordance with claim 22, wherein:
said first PWM signal is at a first frequency and said second PWM signals is at a second frequency different from said first frequency.

24. A motor controller in accordance with claim 23, wherein:
said duty cycle comparator produces said output signal representative of the difference in duty cycles of said first PWM signal and said second PWM signal, independent of the frequencies of said first PWM signal and said second PWM signal.

25. A method of controlling a direct current motor, said method comprising:
receiving a first PWM signal having a duty cycle indicative of a desired rotational speed of said motor:
receiving a digital signal having a frequency indicative of the rotational speed of said motor;
converting said digital signal to a second PWM signal having a duty cycle corresponding to said rotational speed of said motor;
providing a charge accumulation device;
controlling a first controlled current source with said first PWM signal to charge said charge accumulation device;
controlling a second controlled current source with said second PWM signal to discharge said charge accumulation device;
using the charge on said charge accumulation device to produce an output signal representative of the difference in duty cycles of said first PWM signal and said second PWM signal.

26. A method in accordance with claim 25, comprising:
utilizing a capacitor as said charge accumulation device.

27. A method in accordance with claim 25, comprising:
providing said first PWM signal at a first frequency; and
providing said digital signal at a second frequency different from said first frequency.

28. A method in accordance with claim 27, wherein:
said first frequency is higher than said second frequency.

29. A method in accordance with claim 25, comprising:
using the charge on said charge accumulation device to produce an output signal representative of the difference in duty cycles of said first digital signal and said second digital signal, independent of the frequencies of the first digital signal and the second digital signal.

* * * * *